United States Patent [19]

Rozenboom et al.

[11] 4,030,794
[45] June 21, 1977

[54] BUS BAR AND SWITCHBOARD ASSEMBLAGE

[75] Inventors: Gustave Rozenboom, Kokomo; Bernard C. Rickmann, Peru, both of Ind.

[73] Assignee: Square D Company, Park Ridge, Ill.

[22] Filed: Aug. 25, 1975

[21] Appl. No.: 607,386

Related U.S. Application Data

[63] Continuation of Ser. No. 512,671, Oct. 7, 1974, abandoned, which is a continuation of Ser. No. 388,179, Aug. 14, 1973, abandoned.

[52] U.S. Cl. .......................... 339/22 B; 174/133 B
[51] Int. Cl.² ......................................... H01R 9/22
[58] Field of Search ................. 339/20, 21 R, 21 S, 339/22 R, 22 B, 22 T, 23, 24, 242; 174/71 B, 72 B, 88 B, 99 B, 129 B, 133 B, 48

[56] References Cited

UNITED STATES PATENTS

| | | | |
|---|---|---|---|
| 2,969,421 | 1/1961 | Scott, Jr. | 174/129 B |
| 3,077,512 | 2/1963 | Frostick | 174/71 B |
| 3,529,274 | 9/1970 | Routh | 339/21 R |
| 3,725,568 | 4/1973 | Stanley | 174/48 |

FOREIGN PATENTS OR APPLICATIONS 1,928,470  1/1970  Germany ................. 339/22 B Primary Examiner—Roy Lake
Assistant Examiner—Howard N. Goldberg Attorney, Agent, or Firm—Richard T. Guttman; Ernest S. Kettelson

[57] ABSTRACT

A bus bar, for electrical switchboards comprises an elongated extruded imperforate metal bar of rectangular cross section having slots, with parallel side walls, extending the entire length thereof. Some of the slots are of T-shape cross section, each with the T-leg portion opening through a face of the bar. Others of the slots are rectangular grooves of generally uniform width, with smaller V-shaped grooves on opposite sides to accommodate threaded end portions of bolts or screws, and each opens through a face of the bar. T-bolts are arranged with their heads in, and slidable along, the full length of selected ones of said T-slots, respectively, to any desired position. The bolts have threaded stems, each of which extends from its associated head through the leg portion of the T-slot in which its head is disposed, and beyond that face of the bar through which the associated T-slot opens. Each stem is adapted to threadably receive a nut for clamping supporting or connecting brackets to the bar. Mounting bolts are threadedly receivable between the grooved side walls of the "threaded" slots. The bus bars can be mounted on insulating channel members by means of the "threaded" slots and mounting bolts and can be connected to each other with their faces coplanar or in intersecting planes by the T-bolts and companion brackets. The bars can be assembled readily in a switchboard.

7 Claims, 9 Drawing Figures

BUS BAR AND SWITCHBOARD ASSEMBLAGE

This application is a continuation of our prior application Ser. No. 512,671 filed on Oct. 7, 1974, abandoned, which in turn is a continuation of our prior application Ser. No. 388,179 filed on Aug. 14, 1973, abandoned.

BACKGROUND OF THE INVENTION

1. Field of Invention

Electrical bus bars and electrical switchboards employing the same.

2. Description of Prior Art

This invention relates to bus bars for use in relatively large switchboards and to the manner of their incorporation in the switchboard.

Heretofore such bus bars have been in the form of aluminum or copper straps which are first cut to length and then provided with sets of holes through which bolts are received for mounting the bus bars on suitable supports within a cabinet, for connecting them to each other, and for mounting electrical cable connectors thereon. Usually the locations of the holes are predetermined for specific arrangements, the holes being punched by the manufacturer at precise predetermined positions.

The use of holes in different positions along the bus bars limits the possible positions of the bus bars relative to each other and to supporting structure to the one specific arrangement of the original design. Consequently, for each different type and size of switchboard, holes have to be specially laid out and punched in the bus bars.

Another undesirable feature of prior bus bar designs is that the current carrying capacity of the bars is not uniform for all cross sections throughout its length as the total cross section for conducting metal is reduced at those areas in which the holes are provided relative to those areas in which no hole is provided. Accordingly, assuming a bar of uniform thickness and overall width, to provide an amount of conducting cross section at the location of the holes sufficient to meet the rated maximum current carrying capacity of the bar results in an excess of conducting cross section at the imperforate portions, and a resultant waste or inefficient use of the metal.

Considerable layout time and expense is involved in positioning and punching the selected holes.

SUMMARY

In accordance with the present invention, the bus bar can be a length cut from a simple extrusion with certain slots therein extending the full length thereof, and so shaped and arranged that suitable connecting brackets can be postioned and secured firmly in place at any location desired along the length of the bar, and so that two lengths of the bar can be connected together readily in end to end relation with their faces coplanar or with their faces at an abrupt angle; for example 90° to each other. Also, electrical connections can be made to the bar at any position desired along the length of the bar. Further, the lengths of bar may be attached readily to supporting structures at any and all locations along its length.

Various other objects and advantages will become apparent from the following description wherein reference is made to the accompanying drawings.

BRIEF DESCRIPTION OF THE DRAWINGS

Referring to FIGS. 1 through 3, a plurality of lengths of a bus bar embodying the principles of the present invention are shown in assembled relation. Each length is considered an individual bus bar 1, and comprises a length cut off from an extruded imperforate, unitary body of aluminum or other conducting material. Each bus bar 1 has T-slots 2 which extend the full length thereof and are of uniform shape throughout. In the form illustrated in FIG. 3, the bar has four T-slots which are parallel to each other. Each slot has parallel entry side walls 2a defining a T-leg portion 3, and a bottom wall 2b and parallel head side walls 2c, defining a T-head portion 4. Preferably the T-slots are arranged in pairs with the bottom walls 2b of each pair parallel to, and spaced from, each other and with the T-leg portions 3 of the pair opening through opposite faces, respectively, of the bar 1. Further, the T-slots of each pair, though oppositely facing, are preferably aligned with each other in a direction of the thickness of the bus bar 1. At one face of the bus bar 1, a slot or groove 5 is provided. The slot 5 in the form illustrated is of constant width annd depth throughout athe length of the bus bar and is spaced between one of the T-slots 2 and the edge of the bus bar 1 adjacent thereto. The groove 5 extends parallel to the T-slots 2 and for the full length of the bar and is open through the aforementioned one face of the bus bar. The other T-slot 2, at the same one face of the bus bar, is arranged between, and spaced from, two slots or grooves 6 and 7, respectively. The grooves 6 and 7 are the same as the groove 5, except for their locations.

Figure 1:
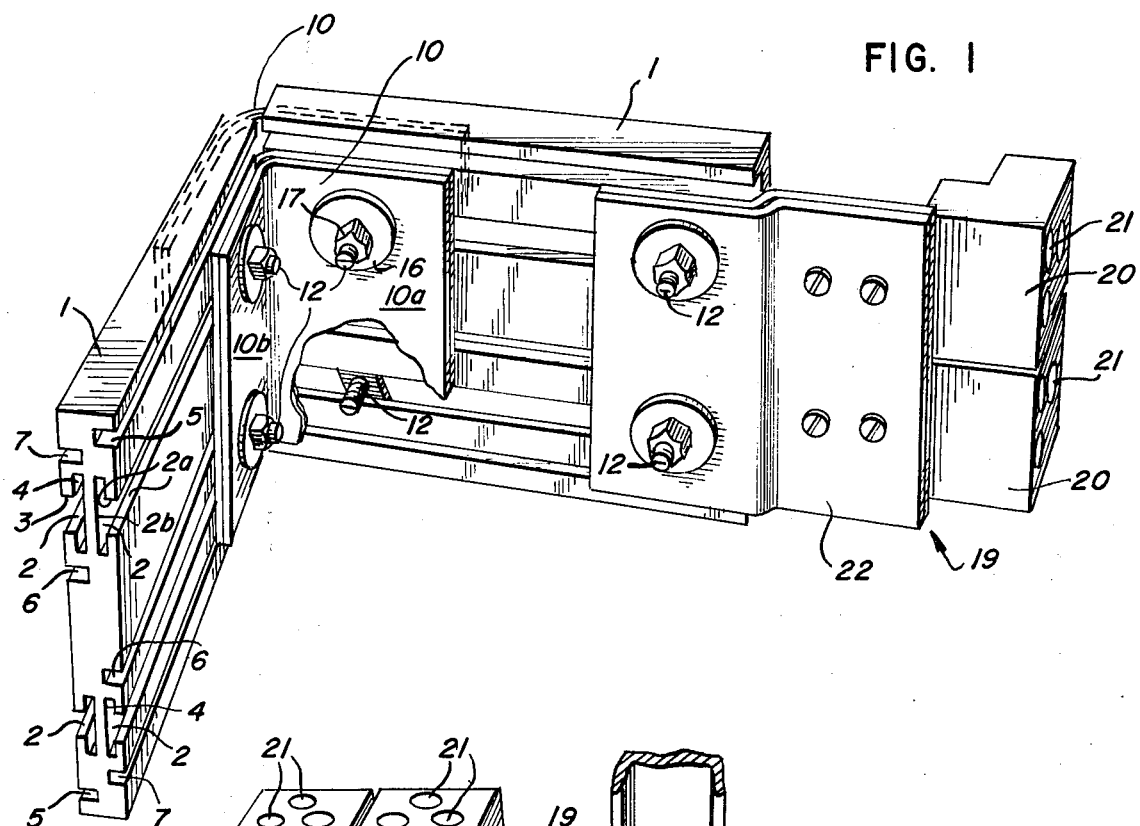
FIG. 1 is a perspective view of a bus bar assembly embodying the principles of the present invention, illustrating two bus bars connected with their faces at right angles to each other and with a pair of three-hole power cable connectors connected to an end of one of the bus bars.

At the opposite face of the bar 1, as best illustrated by the left hand face of the forwardly extending bar 1 in FIG. 1, like grooves 5, 6, and 7 are provided and are arranged symmetrically opposite from those at the one face. For example, where the grooves 6 and 7 are at opposite sides of the lower T-slot 2 of the right hand face of the forwardly extending bus bar 1 of FIG. 1, they are at opposite sides of the upper one of the T-slots 2 of the left hand face, and the groove 5 of the left hand face is provided between the lower T-slot 2 and the lower edge of the bus bar 1 at the left hand face. As will become apparent, contact surface portions are thus defined on both faces of the bus bar 1 between the T-slots 2 of each face and between the T-slots 2 and the adjacent lateral limits of the faces of the bus bar 1. The total width of the contact surface portion of each of the faces of the bus bar 1 between the T-leg portions 3 of the associated slots 2 is greater than twice, and less than three times, the combined width of the T-leg portions 3 of associated slots 2; and the total width of the constant surface portions of each of the faces between the adjacent lateral limits of the face and the associated T-leg portions 3 is also greater than twice, and less than three times, the combined width of the T-leg portions 3 of the associated slots 2.

Figure 3:
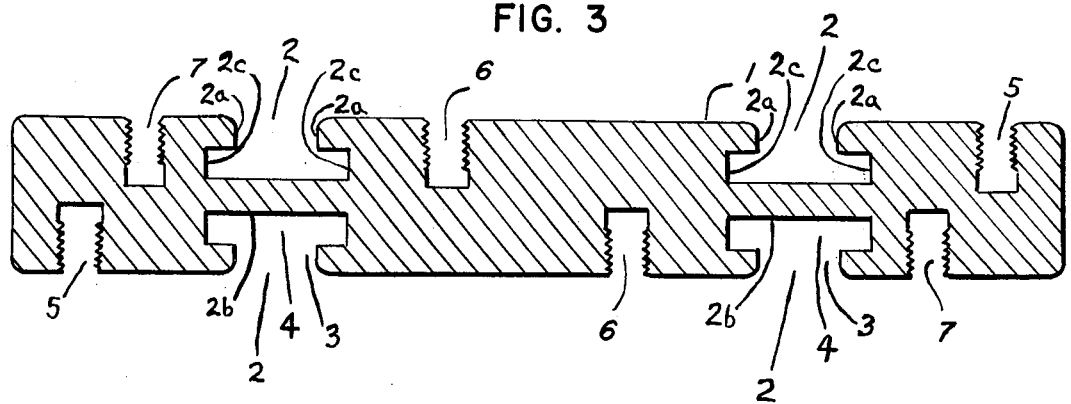
FIG. 3 is an enlarged cross sectional view of one of the bars and is taken on the line 3—3 of FIG. 2.

A bus bar of this formation has distinct advantages structurally and for convenience in manufacture and in assemblage. In the first place, the bar can be extruded in a continuous piece of the stock length desired, and cut into the lengths required for the particular switchboard. Further, the current carrying capacity of the bar, at each cross section along its length, is equal to the current carrying capacity at every other cross section, as the cross section is uniform in size and shape throughout the entire length of the bar. Further, as will be more fully explained hereinafter, brackets for making electrical connections can be disposed in any position desired along the T-slots and there secured to the bus bar. As shown in FIG. 3, the bar can be extruded with V-shaped longitudinal alternate grooves and ridges on the faces of the side walls of the grooves 5 through 7 for receiving mounting screws or bolts at any desired position along the length of the bar, so that the bar can be mounted on insulating upright or other supporting members, in all convenient or desired positions of the support members endwise of the bar.

In the illustrative assembly illustrated in FIG. 1, two bus bars 1 are shown as joined together end to end at right angles to each other with right angle brackets. Obviously, if desired, two bus bars can be joined in end to end coplanar relation by using flat connecting brackets, as distinguished from right angle connecting brackets illustrated in FIG. 1. In the assembly illustrated in FIG. 2, two bus bars 1 are joined together in coplanar relationship with the edge of one engaging the end of the other. Obviously, if desired, two bus bars can be joined in end to end non-coplanar relationship by using right angle connecting brackets, as distinguished from flat connecting brackets illustrated in FIG. 2.

In FIG. 1, two bus bars 1 are shown as connected together by a pair of double brackets 10, arranged one bracket at the forward faces of the two bars and one at the rear faces. Each bracket has two wings 10a and 10b, respectively. The wings are at an angle to each other such as required for the particular assembly, as the right angles shown. The brackets 10 are fastened to the bus bars 1 by T-bolts 12.

Figure 4A:
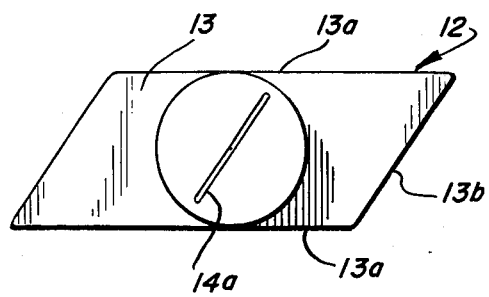
FIG. 4A is a top plan view of a T-bolt used in connection with the bus bar.
Figure 4B:
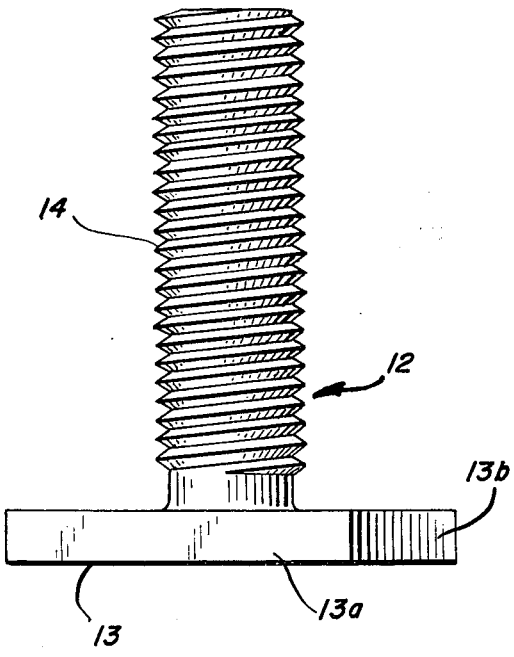
FIG. 4B is a front elevation of the T-bolt illustrated in FIG. 4A.

Each T-bolt 12, as illustrated in FIGS. 4A and 4B, comprises a planar head 13 in the form of an oblique parallelogram, having parallel lateral edges 13a and parallel end edges 13b oblique to the edges 13a, and a threaded stem 14 with its axis normal to the plane of the head 13. The head 13 is insertable into a T-slot 2 through the T-leg portion 3 thereof with its lateral edges 13a parallel to opposite sides of the T-leg portion. When the head 13 is fully inserted, the stem 14 projects through the T-leg portion 3. Starting with the T-bolt in this position, the stem 14 is rotated to dispose the edges 13b at, or closely adjacent to, the side walls of the head portion 4 of the T-slot 2. In this rotated position the head portion 13 is snugly received in the T-slot at the point where thus inserted, but with sufficient operating clearance so that the T-bolt can be slidably adjusted endwise of the T-slot 2 for precise positioning for alignment with holes provided in the wings of the bracket.

Figure 2:
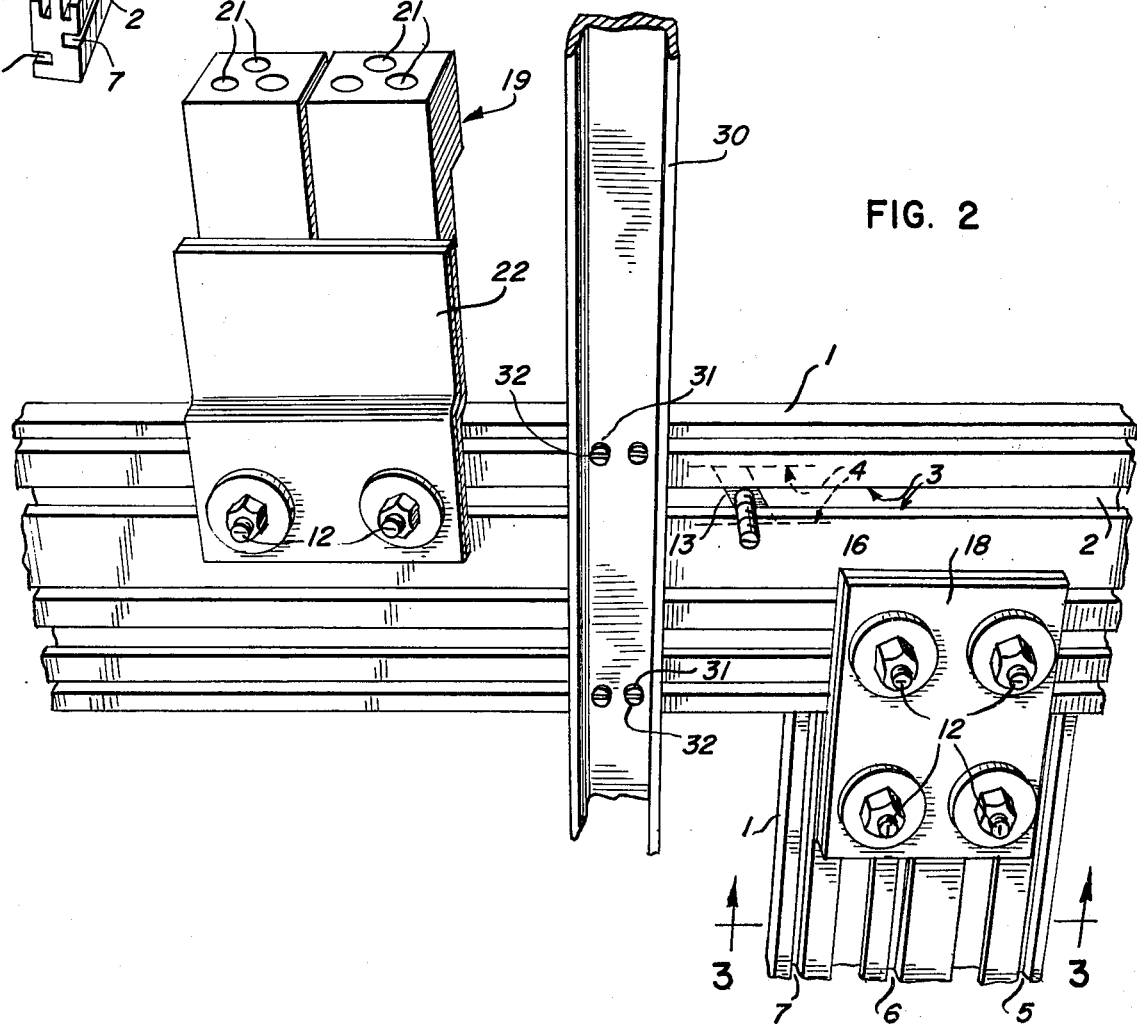
FIG. 2 is a perspective view of a bus bar assembly showing two bus bars connected in end to edge coplanar relation at right angles to each other, and a pair of three-hole power cable connectors and an insulating channel support member connected to one of the bus bars.

The outer end of the stem 14 has a position marker thereon, in the form of a slot 14a which extends endwise of an associated T-slot 2 when the stem has been rotated to disposed the head 13 in proper position with the end edges 13b alongside and parallel to opposite side walls of the T-slot, as indicated in FIG. 2 wherein a T-bolt is shown in a T-slot, but unconnected to any bracket.

Holes, usually two in each wing as illustrated, are provided for receiving the stem 14 of T-bolts 12, respectively. The holes are positioned so that when the T-bolts are in their T-slots 2, at the same face of a bus bar 1, the T-bolts 12 can be aligned with the holes, respectively, endwise of the bus bar so that each T-bolt passes through an aligned one of the holes. Suitable lock washers 16 are disposed on the outer ends of the bolts, and each wing is drawn tightly against its associated face of the bar 1 by means of suitable nuts 17.

The rear double bracket 10 is correspondingly fastened against the opposite faces of the associated bus bars 1.

Thus the bus bars 1 of FIG. 1, are securely clamped between connecting or coupling brackets 10. If desired, the rearmost bus bar 1 may be extended to overlie the rear end of the forwardly extending bus bar in end to end relation, the forwardly extending bar thereby being a lateral take-off bus bar from the front face of the rearmost bus bar 1. In the latter case, two brackets 10 may be secured in like manner to opposite faces of the forwardly extending bus bar 1 and to the opposite faces of the rearmost bus bar 1.

If the forwardly extending bus bar is to be connected to the rearward bus bar in edge to face relation at a location spaced from the ends of the latter, the double bracket 10 may be connected with two wings secured to opposite faces, respectively, of the forwardly extending bus bar, and two wings secured to the forward face of the rearmost bus bar.

As illustrated in FIG. 2, the bus bars 1 are arranged with their forward faces in coplanar relation, with the edge of one bus bar against the end of the other bus bar. As there illustrated, the two bars 1, disposed in the edge to end relationship, are connected by brackets in the form of a pair of flat plates 18, one secured by T-bolts 12 at the forward faces of the bars, two bolts in one slot 2 of the horizontally disposed one of the bars 1 and two, one in each slot 2, in the vertically disposed one of the bars 1. The other plate 18 is secured in like fashion to the bars 1 at their rearward faces. The plates 18 may extend to the top edge of the horizontal one of the bus bars, if desired.

If the bus bars 1 are to be arranged in end to end relationship, then a pair of brackets of plates, such as the plates 18, may be provided and connected thereto by the bolts 12, the plates having holes spaced for connection to two T-slots in each bus bar 1.

For power connections to the bus bars 1, suitable power cable connectors 19 are provided. In FIG. 1, an end connection to the rearmost bus bar is illustrated. The connector 19 comprises a pair of lugs 20 each having three cable-receiving holes 21 therein, and three conventional securing screws, (not shown. A double bracket 22 is bolted to the lugs 20 and is connected by T-bolts 12 to the two T-slots 2 at one face of the bus bar 1, with the holes 21 opening endwise of the length of the bus bar.

As shown in FIG. 2, a connector 19 is provided, and is connected to the horizontal bus bar 1 by its double bracket 22 which is secured by the T-bolt 12 in a desired position crosswise of the bus bar 1, with the cable receiving holes facing upwardly.

The bus bars are supported on insulating supports. As illustrated in FIG. 2, the bus bar 1 is secured to an upright insulating support 30 which preferably is of channel shaped cross section and formed of polyester glass. The support 30 is provided with holes 31 spaced at desired positions, and through which suitable screws or bolts 32 are received. The holes 31 are aligned with selected ones of the grooves 5, 6 and 7, preferably with the grooves which are farthest apart in a direction endwise of the support 30 so as to enhance stability. The bolts 32 are of a size and shape to enter readily between the entry margins of the open sides of the grooves 5 through 7 and thread thereinto by interengagement with the groove and ridges thereon.

Figure 8:
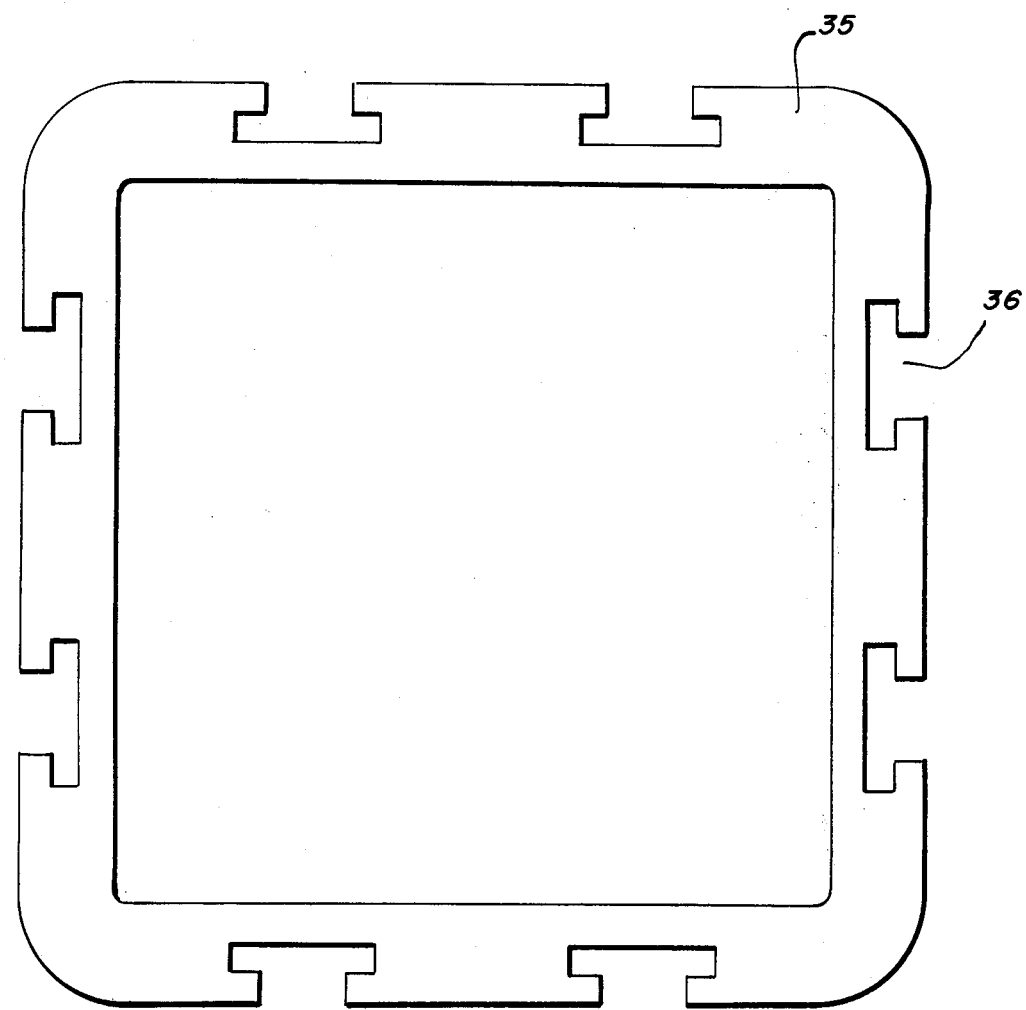
FIG. 8 is a cross sectional view, similar to FIG. 3, of a tubular bus bar embodying some of the principles of the present invention, for carrying more current than that to be carried by the bus bar of FIG. 3.

To provide larger current capacity than that of the bus bars 1 of FIGS. 1 through 3 and yet maintain compatibility with the mounting hardware thereof, a tubular bus bar 35, FIG. 8, may be used. The bus bar 35 is in the form of an extruded tube with T-slots 36, preferably arranged in pairs, one pair opening through each face, as illustrated. The slots 36 extend longitudinally of the tubular bore for its full length and are adapted to receive T-bolts 12 in any selected position lengthwise of the slots, as hereinbefore described.

It is apparent from the foregoing description that with a very few basic parts, an infinitely large number of combinations can be provided, the bus bars being arranged in substantially any selected relation to each other that may be desirable for a particular installation. Electrical connections can be made thereto in an unlimited number of adjusted positions along the length thereof.

The T-shaped grooves eliminate the need in the bus bars for holes for the bolts, which holes necessarily would change the area of the metal of the cross section at the particular location of the holes.

FIGS. 5, 6, 7, 3, and 8 illustrate cross sections of bus bars of successively increasing current capacity.

Figure 5:
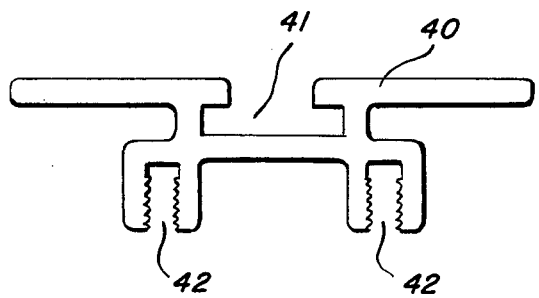
FIG. 5 is a cross sectional view, similar to FIG. 3, showing a modified form of bus bar for carrying less current than the bus bar of FIGS. 1 to 3.

In FIG. 5, a bus bar 40 is shown. The bus bar 40 has a single T-slot 41 opening through one face, and a pair of "threaded" grooves 42 on the opposite face for receiving screws for bolting the bus bar 40 to a support. The bar 40 is rated for a maximum of 600 to 800 amperes of current.

Figure 6:
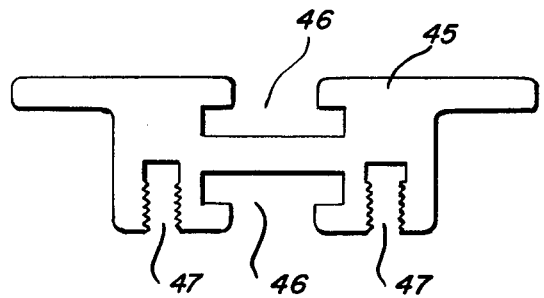
FIG. 6 is a cross-sectional view, similar to FIG. 3, of another modified form of bus for carrying more current than that to be carried by the bus bar of FIG. 5.

In FIG. 6, a bus bar 45 is indicated which is for carrying 1,000 to 1,200 amperes. It has a single T-slot 46 and two grooves 47 at one side and another T-slot 46 at the opposite side, the slots and grooves all being parallel to each other and extending for the full length of the bus bar.

Figure 7:
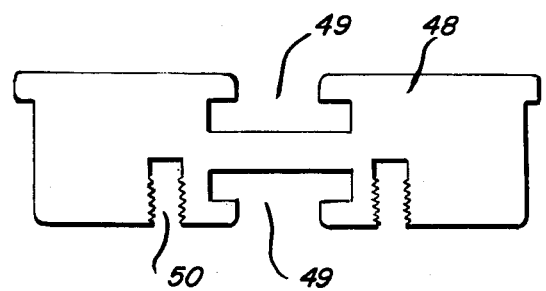
FIG. 7 is a cross sectional view, similar to FIG. 3, illustrating another form of bus bar for carrying more current than that to be carried by the bus bar of FIG. 6.

In FIG. 7, a bus bar 48 is shown having a pair of opposite T-slots 49 aligned with each other with their bases spaced apart and parallel. On one face, two grooves 50 are provided and arranged at opposite sides of the T-slot at that face. The bus bar 48 has a current capacity of 1,600 to 2,000 amperes, compared to 3,000 amperes for the bus bar 1 of FIGS. 1 to 3 and 4,000 amperes for the bus bar 35 of FIG. 8.

All of the bus bar utilize the same T-slots and T-bolts, and the same bolts for fastening them to the supports.

We claim:

1. A bus bar comprising an elongated rigid extruded one piece body of electrically conductive material and of a cross section which is substantially a right angled parallelogram throughout its entire length, each of the faces of the body being planar throughout its entire length and width, and at least two opposite faces being relatively wide and identical with each other; said body having a pair of identical parallel slots of T-shaped cross section extending the full length thereof and disposed with the T-leg portions intersecting said opposite faces, respectively, of the body, and with the T-head portions parallel to said opposite faces, respectively, of the body; said slots further being positioned endwise of the elongated cross section relative to the longitudinal axis of the body so that upon rotation of the body 180° about said axis each said slot will occupy the same position and have the same orientation that the other slot occupied and had, respectively, prior to said portion of the body; and thereby to provide flat, continuous relatively wide electrical contact surfaces coextensive in length and width with said opposite faces, respectively, in all rotated positions of the body about its longitudinal axis; said body having a second pair of T-slots identical,. respectively, with the T-slots of the first mentioned pair; the T-slots of said second pair being positioned at said opposite faces, respectively, and each T-slot of each pair being diametrically opposite, relative to said axis, to a T-slot of the other pair, and said diametrically opposite slots being equidistant from said axis, so that upon rotation of the body 180° about its longitudinal axis the slots at one face will occupy the same position and have the same orientation that the slots at the opposite face had prior to said rotation, and each slot of each pair being identical with the diametrically opposite slot of the other pair; the T-slots of each pair being at opposite sides of the longitudinal axis from the other pairs being spaced equidistantly from said axis, said body cross section being rectangular and of a width several times its thickness, and further having parallel grooves, each parallel with the slots and each having parallel entry side walls which are perpendicular to the planes of said faces of the body, at least one side wall of each groove having parallel alternate ribs and valleys extending endwise of the associated groove for threaded engagement with bolts; said grooves being open through said opposite faces of the body, and being parallel to the axis of the body.

2. A bus bar according to claim 1 wherein said grooves are arranged three grooves opening through each of said opposite faces of the body, two of said grooves at each face being at opposite sides of the opening of one of the T-leg portions of one T-slot at that face and close to the opening thereof, and the other groove which is at the same face being at the outboard side of the T-leg portion of the other of said slots at the same face.

3. A bus bar according to claim 1 wherein each of the slots of each pair is arranged in alignment with one of the slots of the other pair in the direction of the thickness of the body.

4. A bus bar comprising an elongated rigid extruded one piece body of electrically conductive material and of a cross section which is substantially a right angled parallelogram throughout its entire length, each of the faces of the body being planar throughout its entire length and width, and at least two opposite faces being relatively wide and identical with each other; said body having a pair of identical parallel slots of T-shaped cross section extending the full length thereof and disposed with the T-leg portions intersecting said opposite faces, respectively, of the body, and with the T-head portions parallel to said opposite faces, respectively, of the body; said slots further being positioned endwise of the elongated cross section relative to the longitudinal axis of the body so that upon rotation of the body 180° about said axis each said slot will occupy the same position and have the same orientation that the other slot occupied and had, respectively, prior to said rotation of the body; and thereby to provide flat, continuous relatively wide electrical contact surfaces coextensive in length and width with said opposite faces, respectively, in all rotated positions of the body about its longitudinal axis; the total width of the contact surface portion of each of said faces of the body between the T-leg portions of the associated slots being greater than twice, and less than three times, the combined width of said T-leg portions of the associated slots; and the total width of the contact surface portions of each of the said faces between the lateral limits of the face and the associated T-portions also being greater than twice, and less than three times, the combined width of said T-leg portion of said associated slots.

5. A bus bar comprising an elongated rigid extruded one piece body of electrically conductive material and of a cross section which is substantially a right angled parallelogram throughout its entire length, each of the faces of the body being planar, throughout its entire length and width, and two opposite faces being relatively wide with respect to the other two; said body having a pair of elongated T-slots opening to each of said relatively wide faces, the longitudinal axes of said slots respectively being parallel to the longitudinal axis of said bus bar and so spaced apart therefrom in opposite directions toward opposite edges of the bus bar that said slots are reespectively equivalently spatially located when said bus bar is rotated 180° on its said longitudinal axis; each of said slots being spaced inwardly of respective edges of said bar and outwardly of the longitudial midline of said bus bar to define respective first broad electrical contact surfaces between said slots and said respective edges and respective second broad electrical contact surfaces between said slots and said longitudinal midline; whereby a conductor having a connecting contact face less than the full width of said bus bar which spans both said first and second contact surfaces on each side of one of said slots when positioned thereagainst may be secured to said bus bar in broad electrical contact therewith on both sides of said one of said slots to one side of the longitudinal midline of said bus bar; and said body further having a groove in one of the first and second broad electrical contact surfaces for receiving fastening means to secure the bus bar to insulative supporting means for the bus bar; said groove being parallel with the slots and having parallel entry side walls which are perpendicular to the planes of the relatively wide faces of the body.

6. A bus bar according to claim 5 wherein said body has a groove in each of two of said second broad electrical contact surfaces each of which is parallel to the slots and each having parallel entry side walls which are perpendicular to the planes of the relatively wide faces of the body.

7. A bus bar according to claim 6 wherein said grooves in said second broad electrical contact surfaces open to the opposite relatively wide faces of the body, respectively, and are equidistantly spaced in opposite directions from the longitudinal center line of the body.

* * * * *

UNITED STATES PATENT AND TRADEMARK OFFICE
CERTIFICATE OF CORRECTION

PATENT NO. : 4,030,794
DATED : June 21, 1977
INVENTOR(S) : G. Rozenboom & B. C. Rickmann It is certified that error appears in the above-identified patent and that said Letters Patent are hereby corrected as shown below:

Col. 2, line 25, after "bus" insert --bar--.

Col. 2, line 56, change "athe" to --the--.

Col. 6, lines 30 and 31, Claim 1, change "portion" to --rotation--.

Col. 8, line 18, Claim 5, after "bar" insert --but--.

Col. 8, line 22, Claim 5, after "slots" insert --and--.

Signed and Sealed this

Third Day of July 1979

[SEAL]

Attest:

*Attesting Officer*

LUTRELLE F. PARKER
*Acting Commissioner of Patents and Trademarks*